(12) United States Patent
Zhang et al.

(10) Patent No.: US 9,577,731 B1
(45) Date of Patent: Feb. 21, 2017

(54) RADIO FREQUENCY COMMUNICATION WITH ANTENNA INDEX CODING

(71) Applicant: Wisconsin Alumni Research Foundation, Madison, WI (US)

(72) Inventors: Xinyu Zhang, Madison, WI (US); Sanjib Sur, Madison, WI (US); Teng Wei, Madison, WI (US)

(73) Assignee: National Science Foundation, Arlington, VA (US)

( * ) Notice: Subject to any disclaimer, the term of this patent is extended or adjusted under 35 U.S.C. 154(b) by 0 days.

(21) Appl. No.: 14/921,346

(22) Filed: Oct. 23, 2015

(51) Int. Cl.
| H04L 1/02 | (2006.01) |
| H04B 7/06 | (2006.01) |
| H04L 1/00 | (2006.01) |
| H04B 7/08 | (2006.01) |
| H04L 5/00 | (2006.01) |
| H04B 7/04 | (2006.01) |

(52) U.S. Cl.
CPC .......... *H04B 7/0604* (2013.01); *H04B 7/0413* (2013.01); *H04B 7/0825* (2013.01); *H04L 1/0033* (2013.01); *H04L 5/0023* (2013.01)

(58) Field of Classification Search
CPC ... H04B 7/0619; H04B 7/0608; H04L 5/0023; H04L 1/0026; H04L 1/0625
USPC 375/298, 267, 295, 299, 347, 349; 342/372, 374; 455/63.1, 79
See application file for complete search history.

(56) References Cited

U.S. PATENT DOCUMENTS

| 2010/0310005 | A1* | 12/2010 | Takagi | H04B 7/061 375/295 |
| 2014/0199952 | A1* | 7/2014 | Sandhu | H03F 1/303 455/91 |
| 2015/0188616 | A1* | 7/2015 | Hu | H04B 1/3838 455/101 |
| 2016/0031332 | A1* | 2/2016 | Garcia Briz | B60L 11/182 320/108 |

OTHER PUBLICATIONS

Khan et al.: "Model-driven energy-aware rate adaptation." In Proceedings of the fourteenth ACM international symposium on Mobile ad hoc networking and computing, pp. 217-226. ACM, 2013, US.

(Continued)

*Primary Examiner* — Khai Tran
(74) *Attorney, Agent, or Firm* — Boyle Fredrickson, S.C.

(57) ABSTRACT

The inventors have recognized that in RF communication systems, by switching between transmit antennas of an RF transmitter on a sub-symbol basis (antenna index coding), and/or by adaptively determining how often antenna switching occurs (adaptive antenna hopping), an increased amount of data may be wirelessly transmitted to an RF receiver without significantly increasing energy consumption. The inventors have determined that in certain systems, such as ZigBee, data symbols consist of elementary waveform patterns, and that such waveform patterns for transmit antennas may be stored by an RF receiver for later determining transmit antennas for data symbols. The inventors have also determined that the invention may be applied in the frequency domain, such as to OFDM, by storing subcarrier waveform patterns for particular transmit antennas and later determining transmit antennas for subcarriers of data symbols.

20 Claims, 8 Drawing Sheets

(56) References Cited

OTHER PUBLICATIONS

Li et al.: "Energy-based rate adaptation for 802.11 n." In Proceedings of the 18th annual international conference on Mobile computing and networking, pp. 341-352. ACM, 2012. US.

Jeganathan et al.; "Space shift keying modulation for MIMO channels." Wireless Communications, IEEE Transactions on 8, No. 7 (2009): 3692-3703. US.

Renzo et al.; "Spatial modulation for generalized MIMO: Challenges, opportunities, and implementation." Proceedings of the IEEE 102, No. 1 (2014): 56-103. US.

Jang et al.; "Snooze: energy management in 802.11 n WLANs." In Proceedings of the Seventh COnference on emerging Networking EXperiments and Technologies, p. 12. ACM, 2011. US.

Cidon et al.; "Flashback: Decoupled lightweight wireless control." ACM SIGCOMM Computer Communication Review 42, No. 4 (2012): 223-234. US.

Sani et al.; "Directional antenna diversity for mobile devices: characterizations and solutions." In Proceedings of the sixteenth annual international conference on Mobile computing and networking, pp. 221-232. ACM, 2010. US.

Driusso et al.; "OFDM aided space-time shift keying for dispersive downlink channels." In Vehicular Technology Conference (VTC Fall), 2012 IEEE, pp. 1-5. IEEE, 2012.

Chang et al.; "Energy efficient transmission over space shift keying modulated MIMO channels." Communications, IEEE Transactions on 60, No. 10 (2012): 2950-2959.

Mesleh et al.: "Spatial modulation." Vehicular Technology, IEEE Transactions on 57, No. 4 (2008): 2228-2241.

Weissman; "Capacity of channels with action-dependent states." Information Theory, IEEE Transactions on 56, No. 11 (2010): 5396-5411.

A. Younis et al.; "Performance of spatial modulation using measured real-world channels." In Vehicular Technology Conference (VTC Fall), 2013 IEEE 78th. pp. 1-5. IEEE, 2013.

Magistretti et al.; "802.11 ec: collision avoidance without control messages." IEEE/ACM Transactions on Networking (TON) 22, No. 6 (2014): 1845-1858.

Wu et al.; "Side channel: bits over interference." Mobile Computing. IEEE Transactions on 11, No. 8 (2012): 1317-1330.

Sanayei et al.: "Antenna selection in MIMO systems." Communications Magazine, IEEE 42, No. 10 (2004): 68-73.

Molisch et al.: "Capacity of MIMO systems with antenna selection." Wireless Communications, IEEE Transactions on 4, No. 4 (2005): 1759-1772.

\* cited by examiner

FIG. 17

RADIO FREQUENCY COMMUNICATION WITH ANTENNA INDEX CODING

STATEMENT REGARDING FEDERALLY SPONSORED RESEARCH OR DEVELOPMENT

This invention was made with government support under CNS-1318292, CNS-1343363, CNS-1350039, and CNS-1404613 awarded by the National Science Foundation. The government has certain rights in the invention.

FIELD OF THE INVENTION

The present invention is directed to the field of Radio Frequency (RF) communication systems, and more particularly, to systems and methods for improving data transmission in such systems.

BACKGROUND OF THE INVENTION

In Radio Frequency (RF) communication systems, Multiple-Input, Multiple-Output (MIMO) has been an important enabling technology for high-rate wireless standards in communications. Compared with conventional Single-Input, Single-Output (SISO) links, a MIMO transmitter can code the same data symbols through multiple antennas, thus achieving a diversity gain. A MIMO transmitter can also allow parallel transmission of different data symbols through different antennas, thus achieving a multiplexing gain.

Both diversity and multiplexing mechanisms typically scale throughput with the number of antennas without requiring additional RF spectrum. However, a MIMO radio must accompany each antenna with a separate RF chain, including, for example, a Digital to Analog Converter (DAC), amplifier, various filters and the like. Such components in an RF chain account for a significant amount of an RF transceiver's power cost, and MIMO power consumption typically increases linearly with the number of RF chains. As a result, the addition of RF chains and antennas often nullifies the improvement in link capacity, which may result in even lower energy-per-bit than SISO. What is needed is an improved mechanism for RF communication in which data may be communicated more efficiently (with link capacity increased) without increasing power limitations.

SUMMARY OF THE INVENTION

The inventors have recognized that in RF communication systems, by switching between transmit antennas of an RF transmitter on a sub-symbol basis (antenna index coding), and/or by adaptively determining how often antenna switching occurs (adaptive antenna hopping), an increased amount of data may be wirelessly transmitted to an RF receiver without significantly increasing energy consumption. The inventors have determined that in certain systems, such as ZigBee, data symbols consist of elementary waveform patterns, and that such waveform patterns for transmit antennas may be stored by an RF receiver for later determining transmit antennas for data symbols. The inventors have also determined that the invention may be applied in the frequency domain, such as to OFDM, by storing subcarrier waveform patterns for particular transmit antennas and later determining transmit antennas for subcarriers of data symbols.

Accordingly, provided is a mechanism to bring MIMO benefits to energy-constrained wireless devices, particularly with respect to Wi-Fi and ZigBee protocols. An antenna hopping scheme may be implemented in which a transmitter runs on a single RF chain, but switching between multiple passive antennas. This mechanism may use the index of the antenna to convey extra bits of information on top of the original data symbols being transmitted. The receiver may use a single antenna. While decoding the data symbols, the receiver can decipher the transmit antenna's index inside each symbol. Different transmit antennas' symbols are distorted by the channel in different ways. The distortion can be modeled as a complex multiplier, which the receiver can use as a signature to determine the transmit antenna index. Then, the receiver can normalize the data symbol by the signature, so that the extra bits in the symbol can be successfully decoded.

Modification to antenna index coding may be made based on implementation of time-domain systems, such as ZigBee, versus frequency domain systems, such as OFDM Wi-Fi. With respect to time-domain systems, ZigBee is a single-carrier system in which each data symbol occupies the entire spectrum bandwidth, with its time-domain waveform including a sequence of wavelets called chips. The receiver decodes individual chips to remap to desired data bits. On the other hand, with respect to frequency-domain systems, OFDM Wi-Fi is a multi-carrier system. In OFDM Wi-Fi, bits are modulated into data symbols, each data symbol, represented by a complex sample, is modulated onto a frequency bin called a subcarrier. A group of subcarriers forms a data symbol, and a group of data symbols forms a packet. In OFDM, due to the way symbols are embedded within one another, they are inseparable in the time domain, so OFDM Wi-Fi antenna index coding may be accomplished in the frequency domain.

Accordingly, bandwidth and/or energy efficiency of wireless devices may be significantly improved, including for battery powered wireless devices, sensors Internet of Things (IOT) devices, and so forth, by transmitting extra bits while not requiring additional RF chain components to achieve equivalent performance.

The present invention achieves antenna hopping in real communications systems like ZigBee and Wi-Fi. It employs an antenna index coding (AIC) framework that enables a fine-grained antenna hopping. The inventors have recognized that implemented wireless devices typically compound symbol-level modulation (such as Binary Phase-Shift Keying (BPSK)) with wideband channel spreading (such as Direct Sequence Spread Spectrum (DSSS)). Consequently, the present invention may embed multiple bits of antenna-index information in each original data symbol, by using sub-symbol level antenna hopping. Further, to obviate the need for multiple RF chains at the receiver side, the present invention may implement redundancy in antenna hopping patterns, such that decoding errors can be minimized without incurring significant overhead.

Also, while employing more antennas may allow more bits to be conveyed through antenna switching, it may also increase the Bite Error Rate (BER) of original data symbols that are bottlenecked by the weakest channel. Aspects of the present invention may employ an adaptive antenna hopping protocol that efficiently selects a subset of antennas to optimize this tradeoff, based on a model-driven framework instrumented by channel profile measurements.

Also, because a data symbol may consist of multiple complex samples, the present invention may avoid under-utilization of antenna index coding by switching antenna per sample (sub-symbol switching) in order to convey more information per unit time. The invention may require the transmitter to use the same antenna for a minimum number of samples Ns, which could be set, for example, to a value between 1 chip (4 samples) and 1 symbol (32 chips). The receiver may take advantage of such redundancy to minimize antenna decoding errors.

The invention is also described in "Bringing Multi-Antenna Gain to Energy-Constrained Wireless Devices," Sanjib Sur, Teng Wei, and Xinyu Zhang, University of Wisconsin-Madison, ACM/IEEE International Conference on Information Processing in Sensor Networks (ISPN) 2015 (Apr. 14-16, 2015), which document is incorporated herein by reference in its entirety.

Specifically then, one aspect of the present invention provides an RF communication system including: first and second antennas; an RF transmitter in communication with the first and second antennas, the RF transmitter being operable to send a data symbol using at least one of the first and second antennas, the data symbol including multiple waveform patterns, the data symbol forming a first data stream; and a control system in communication with the RF transmitter. The control system may be operable to send a second data stream by selectively switching the RF transmitter to send a first portion of the data symbol using the first antenna and a second portion of the data symbol using the second antenna.

Another aspect of the invention may provide a method of RF communication using an RF transmitter in communication with first and second antennas. The method may include: sending multiple data symbols using the first and second antennas, each data symbol including multiple waveform patterns, the multiple data symbols forming a first data stream; and sending a second data stream by selectively switching the RF transmitter to send a first portion of the data symbol using the first antenna and a second portion of the data symbol using the second antenna.

Another aspect of the invention may provide an RF communication system including: first and second antennas; first and second RF transmitters in communication with the first and second antennas, respectively, the first and second RF transmitters being operable to send a data symbol using the first and second antennas, the data symbol including multiple subcarrier waveform patterns, the data symbol forming a first data stream; and a control system in communication with the first and second RF transmitters. The control system may be operable to send a second data stream by sending a first subcarrier waveform pattern using the first antenna and a second subcarrier waveform pattern using the second antenna.

Another aspect of the invention may provide a method of RF communication using first and second RF transmitters in communication with first and second antennas, respectively. The method may include: sending multiple data symbols using the first and second antennas, each data symbol including multiple subcarrier waveform patterns, the multiple data symbols forming a first data stream; and sending a second data stream by switching the RF transmitter to send a first subcarrier waveform pattern of a data symbol using the first antenna and a second subcarrier waveform pattern of the data symbol using the second antenna.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications. For example, one could readily extend the description to more than two antennas.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENT

Figure 1:
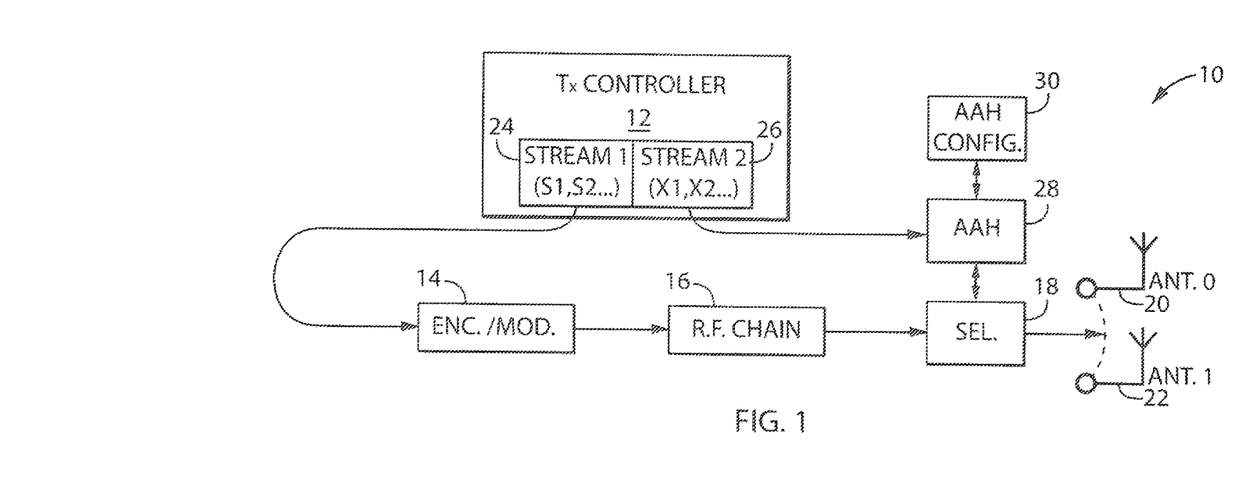
FIG. 1 is a diagram of an RF communication system with a transmitter in accordance with an embodiment of the invention.

Referring now to FIG. 1, a diagram of an RF communication system 10 (transmit system) which may be used for wireless data transmission is provided in accordance with an embodiment of the invention. Although exemplified in FIG. 1 as a transmitter, the RF communication system 10 will typically be part of a transceiver in a larger wireless communicating device, such as a smartphone, tablet, battery powered or other device, allowing both transmit and receive functions. For example, the RF communication system 10 may be part of a ZigBee communication network, such as with respect to the IEEE 802.15.4 specification.

The RF communication system 10 may include a controller 12 in communication with an encoder/modulator 14. The encoder/modulator 14, in turn, may be in communication with an RF chain 16 (or RF transmitter or transceiver), which may typically include a Digital to Analog Converter (DAC), amplifiers, filters, signal conditioners and/or other elements for effecting RF communication as known in the art. The RF chain 16, in turn, may be in communication with a switch 18, which may selectively switch among multiple antennas, such as first antenna 20 ("ANT. 1") and second antenna 22 ("ANT. 2"), configured for effecting RF transmissions. Although two transmit antennas are shown by way of example, one could readily extend the transmit system to more than two antennas for transmitting RF communications within the scope of the invention. In other words, the system can be straightforwardly extended to more than two antennas.

To transmit an increased amount of data without significantly increasing energy consumption, the controller 12 divides data to be sent into a first data stream 24 ("STREAM 1") and a second data stream 26 ("STREAM 2"). The first data stream 24 may be encoded and/or modulated by the encoder/modulator 14, then conditioned by the RF chain 16, for being transmitted as multiple data symbols ("S1," "S2," and so forth) using either the first or second antennas 20 and 22, respectively. The data symbols of the first data stream 24 may be sent, for example, using Binary Phase-Shift Keying (BPSK), Quadrature-Shift Keying (QPSK), or other techniques.

Figure 4:
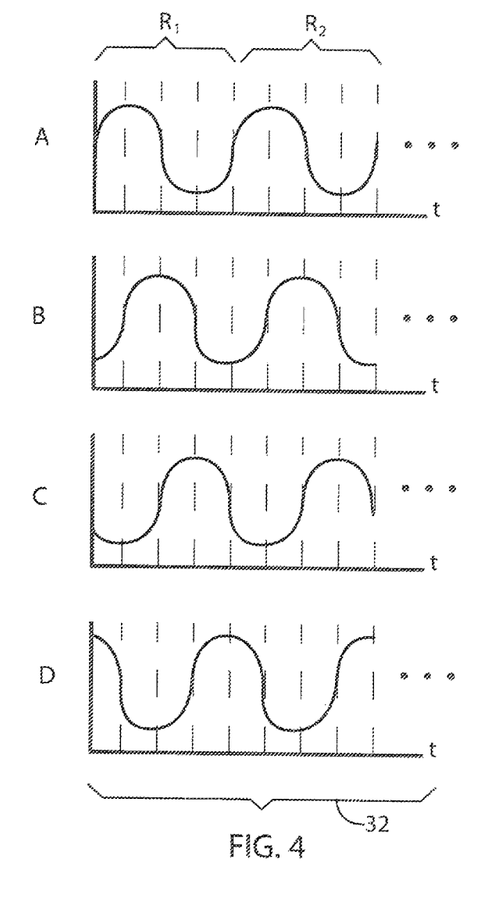
FIG. 4 is a diagram of exemplary waveform patterns which may be sent by the communication system of FIG. 1.

Turning briefly to FIG. 4, each data symbol may consist of a series of elementary waveform patterns 32, such waveform patterns "A," "B," "C" and "D" (which may be wavelets or chips) These waveform patterns may differ, for example, by a quarter of a phase each, and any combination of four of these waveform patterns may form a data symbol. This is analogous to the 4 elementary patterns (corresponding to 32 complex samples) for ZigBee. However, in alternative aspects, more or less waveform patterns of varying types may be used to form a data symbol.

Referring back to FIG. 1, the second data stream 26 may be sent to an adaptive antenna hopping ("AAH") control system 28 for controlling the switch 18. Accordingly, the AAH control system 28, which may be in communication with an adaptive antenna hopping ("AAH") configuration 30, may operate to determine which waveform patterns of data symbols are transmitted by which antennas. Accordingly, the AAH control system 28 sends extra bits of the second data stream 26 ("X1," "X2," and so forth) by switching the RF chain 16 to transmit certain waveform patterns using the first antenna 20 and other waveforms pattern using the second antenna 22 to achieve antenna index coding, similar to Space Shift Keying (SSK).

Figure 2:
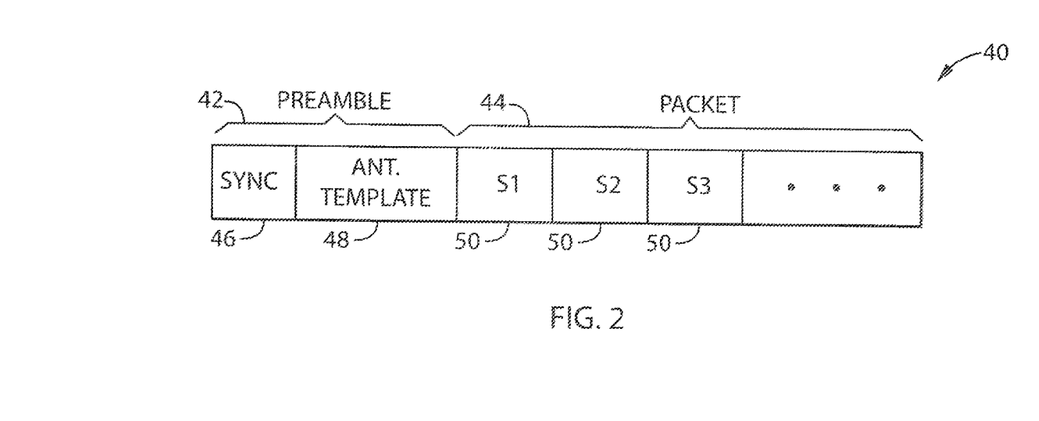
FIG. 2 is an exemplary transmission which may be sent by the RF communication system of FIG. 1.

Referring now to FIG. 2, an exemplary transmission 40 which may be sent by the RF communication system 10 is provided. The transmission 40 may include a preamble 42 followed by a packet 44 (or data payload) consisting of multiple data symbols 50. The preamble 42 could include, for example, a synchronization field 46 and an antenna template 48. The synchronization field 46 may be a start protocol recognizable by an RF receiver such that, upon detecting the start protocol, the RF receiver is prepared to receive subsequent fields of the transmission 40. For example, the synchronization field 46 could be a ZigBee synchronization preamble. The antenna template 48 may provide a predetermined set of waveform patterns per antenna (such as a short sequence of known data symbols emitted sequentially by different transmit antennas), such that the RF receiver may receive and recognize signal constellation patterns for the waveform patterns for each transmit antenna. Different transmit antennas of the transmit system may each send the same antenna template; and the receiver system, via the receiver antenna, may receive each of the antenna templates and may distinguish the different transmit antennas by the channel distortions over each of the antenna templates.

Figure 5A:
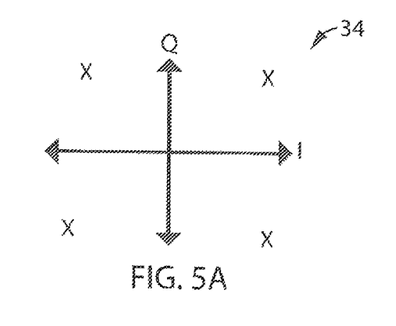
FIG. 5A is a diagram of an exemplary signal constellation pattern for a transmitted signal.
Figure 5B:
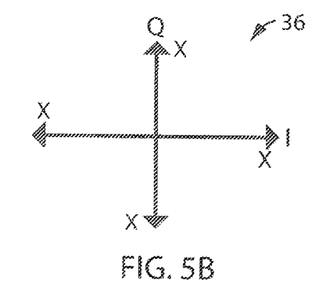
FIG. 5B is a diagram of an exemplary signal constellation pattern for a signal transmitted by a first antenna and observed by a receiver.
Figure 5C:
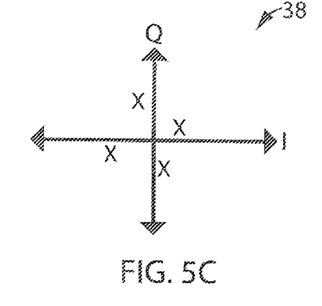
FIG. 5C is a diagram of an exemplary signal constellation pattern for a signal transmitted by a second antenna and observed by a receiver, each in accordance with an embodiment of the invention.

For example, as shown in FIG. 5A, a transmit signal from the first antenna 20, or the same transmit signal from the second antenna 22, may be detected with a first signal constellation pattern 34 with respect to a real, or in-phase ("I"), axis, and an imaginary, or quadrature ("Q"), axis. However, due to varying channel distortions in the environment, at a receiver system, the same transmit signal from the first antenna 20 may be detected with a second signal constellation pattern 36, as shown in FIG. 5B. Similarly, at a receiver system, the same transmit signal from the second antenna 22 may be detected with a third signal constellation pattern 38, as shown in FIG. 5C.

Turning again briefly to FIG. 4, to minimize the effect of signal variations which may be caused by channel noise, each transmit antenna may repeat each waveform patterns (training template) Rz times (a repetition of two is shown), and a receiver may use the average of the repetitions as one template. Aspects of the synchronization field 46 and antenna template 48 may be modified or combined in various ways within the scope of the invention.

Figure 3:
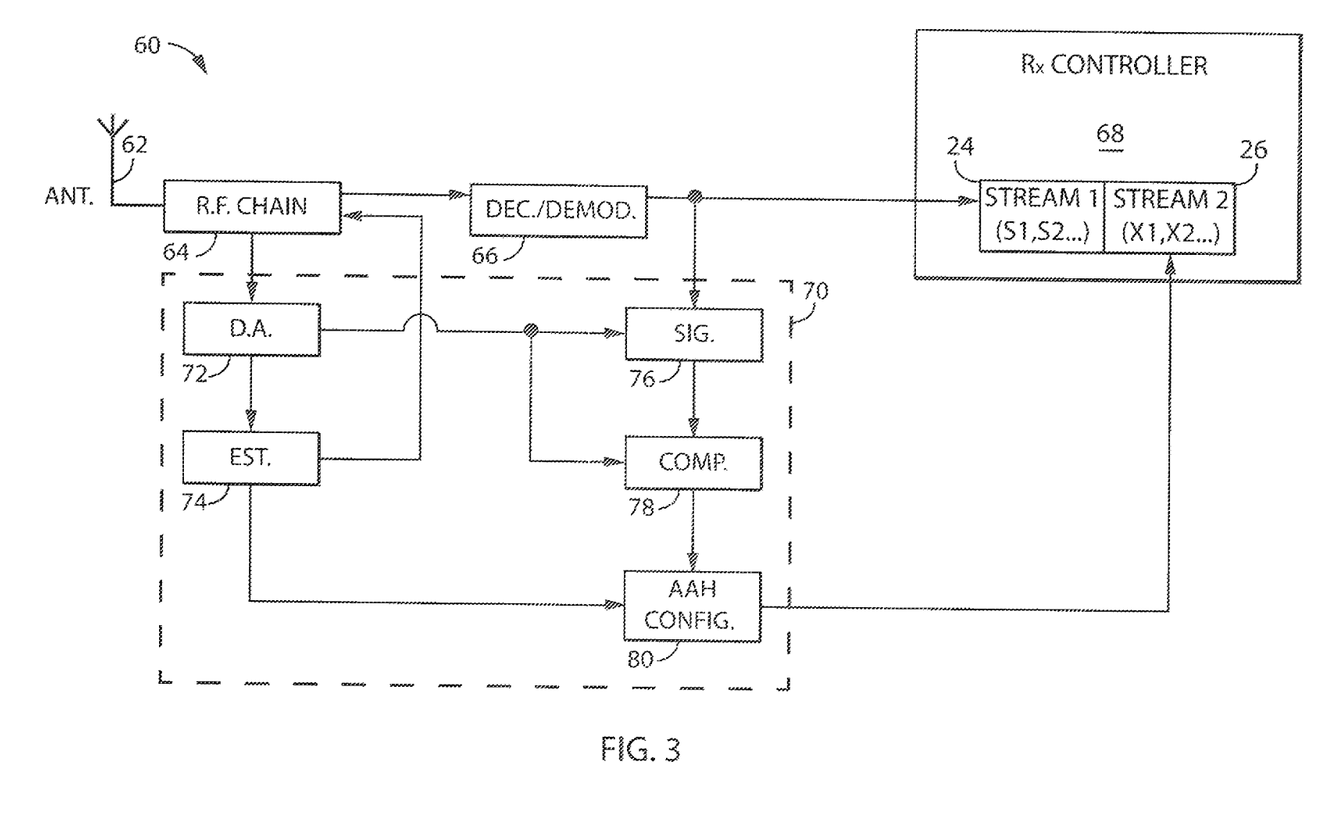
FIG. 3 is a diagram of an RF communication system with a receiver in accordance with an embodiment of the invention.

Referring now to FIG. 3, a diagram of an RF communication system 60 (receiver system) also used for wireless data transmission is provided in accordance with an embodiment of the invention. Although exemplified in FIG. 3 as a receiver, the RF communication system 60 will also typically be part of a transceiver in a larger wireless communicating device, such as a smartphone, tablet, battery powered or other device, allowing both transmit and receive functions. For example, the RF communication system 60 may also be part of a ZigBee or Wi-Fi communication network, and may be combined or integrated with aspects of the RF communication system 10 of FIG. 1 in various ways to achieve bidirectional communication.

In the RF communication system 60, an antenna 62 ("ANT.") may be configured to receive RF transmissions described above with respect to FIGS. 1 and 2. Although one receiver antenna is shown by way of example, one could readily extend the receiver system to include more than one antenna for receiving RF communications within the scope of the invention. The antenna 62, in turn, may be in communication with an RF chain 64 (or RF receiver or transceiver), which may typically include a Analog to Digital Converter (ADC), amplifiers, filters, signal conditioners and/or other elements for effecting RF communication as known in the art. The RF chain 64, in turn, may be in communication with decoder/demodulator 66. The decoder/demodulator 66, in turn, may be communication with a controller 68.

To receive the first data stream 24, after receiving synchronization field 46, the RF communication system 60 simply receives the packet 44, including the data symbols ("S1," "S2," and so forth), which is provided to the controller 68, as known in the art.

To receive the second data stream 26, the RF communication system 60 uses a decoding system 70, which may include: a distortion analyzer 72 (in communication with the RF chain 64); a channel estimator 74, a signature library 76 and a comparator engine 78 (each in communication with the distortion analyzer 72); and an adaptive antenna hopping ("AAH") configuration 80 (in communication with the comparator engine 78).

In operation, after the RF communication system 60 receives the synchronization field 46, the distortion analyzer 72 is triggered to receive the antenna template 48. Accordingly, the distortion analyzer 72 may provide a predetermined set of waveform patterns per antenna, based on a short sequence of known data symbols emitted sequentially by different transmit antennas (see also FIGS. 4, 5A, 5B and 5C), to the signature library 76 (signatures may differ in the way they distort the original signal constellation's phase/magnitude pattern). Next, the distortion analyzer 72 is triggered to receive and send data symbols of the packet 44 to the comparator engine 78. The comparator engine 78 then compares the collection of waveform patterns per antenna stored in the signature library 76 to the waveform patterns of data symbols 50 to determine which transmit antennas sent the particular waveform patterns. Upon determining the transmit antennas for the waveform patterns, which may be symbol by symbol, packet by packet, or otherwise, the decoding system 70 may reference the AAH configuration 80 to decode the extra bits of the second data stream 26, which is, in turn, provided to the controller 68. In other words, the collection of waveform patterns per antenna, stored in the signature library 76, act as templates for decoding the transmit antenna index hidden in the data symbols of the first data stream 24.

With antenna index coding, to achieve high decoding confidence, signatures of the transmit antennas should be as dissimilar as possible. However, if two transmit antennas with highly disparate channel gains are used, the transmit antenna with relatively low magnitude (and therefore low Signal to Noise Ratio (SNR)), may bottleneck system bandwidth. In order to strike a balance between channel dissimilarity and quality, adaptive antenna hopping is employed to strategically hop between an optimal subset of antennas.

To implement adaptive antenna hopping, the transmit system (RF communication system 10) may send a polling packet with all antennas sequentially transmitting for channel-estimation via the antenna template 48. The distortion analyzer 72 of the receiver system (RF communication system 60) is then triggered to receive and send the polling packet to the channel estimator 74. The channel estimator 74, in turn, estimates an optimal antenna configuration across several dimensions, such as antenna combination, number of subcarriers per antenna (frequency domain) and/or encoding/modulation size, in order to maximize throughput. Then, the receiver system (RF communication system 60) transmits back to the transmit system (RF communication system 10) to inform the transmitter to use the configuration determined by the channel estimator 74 in subsequent antenna index coding transmissions.

The optimal configuration may vary due to channel variation. Thus, the receiver system may monitor throughput, denoted by TH(t), for a current configuration. If its deviation to the initial throughput $|[(TH(t))/(TH_0)]-1|$ is larger than a certain threshold a (which may be an empirical value 0.1 by default), then the configuration is outdated, and the receiver system may request the transmitter system to send a new polling packet.

Figure 6:
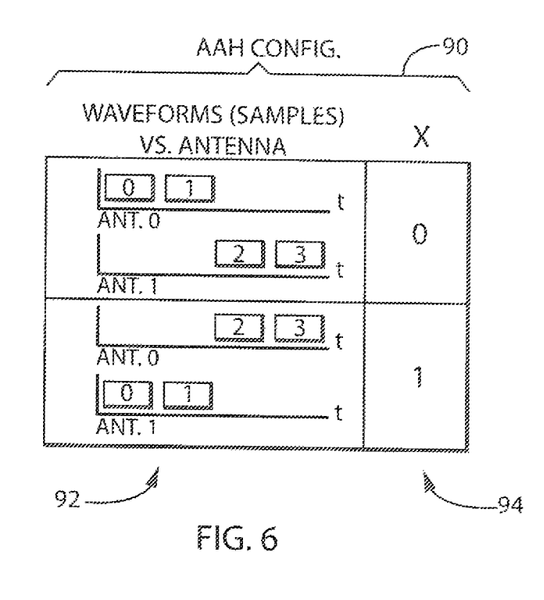
FIG. 6 is a table of an exemplary adaptive antenna hopping configuration with a minimum number of waveform patterns per antenna corresponding to extra bits which may be transferred in accordance with an embodiment of the invention.

Referring now to FIG. 6, a table 90 of an exemplary adaptive antenna hopping configuration with a minimum number of waveform patterns per antenna corresponding to extra bits which may be wirelessly communicated is provided. Following resolution by the channel estimator 74, the table 90 (which may be updated after a polling packet as described above with respect to FIG. 3) may be provided to the AAH configuration 30 for the transmitter system and the AAH configuration 80 for the receiver system.

In a first column 92 of the table 90, various possibilities are provided for the transmitter system to transmit a data symbol which may consist of any four of the waveform patterns 32 (labeled sequentially "0," "," "2" and "3" in the table 90) using various antennas. For example, in a first row of the column 92, two waveform patterns may first be sent by ANT 0 (such as waveform patterns "A" and "B"), then two more waveform patterns may be sent by ANT 1 (such as waveform patterns "A" and "C").

In a second column 94 of the table 90, extra bits are provided as corresponding to particular antenna configurations for the waveform patterns for each respective row. For example, in a first row of the column 92, corresponding to the first row of the table 90, the transmit system (RF communication system 10) may transmit extra bit "0," as part of the second data stream 26, by transmitting the first two waveform patterns of a data symbol via ANT 0, then transmitting the next two waveform patterns of the data symbol via ANT 1. The receiver system (RF communication system 60), in turn, may receive the extra bit "0," as part of the second data stream 26, upon decoding the antenna index of the received waveform patterns of the data symbol.

As part of adaptive antenna hopping, the AAH control system 28, according to the AAH configuration 30 (and the table 90) set by the channel estimator 74, may require the transmit system to send a minimum number of waveform patterns per antenna. Accordingly, the channel estimator 74 (of the receiver system), upon performing channel estimation per antenna, may determine an optimal value for a minimum number of waveform patterns to be transmitted per antenna in order to minimize waveform pattern decoding errors by the receiver system. For example, as shown in FIG. 6, the value for a minimum number of waveform patterns to be transmitted per antenna may be set to two, with at least two waveform patterns being transmitted by ANT 0 and at least two waveform patterns being transmitted by ANT 1 per data symbol.

Figure 7:
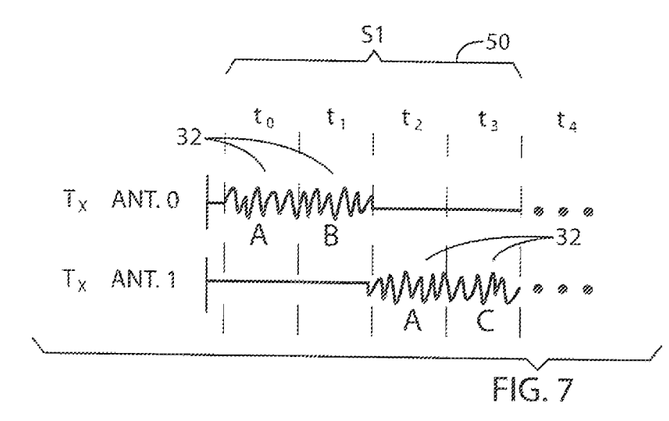
FIG. 7 is a diagram of exemplary waveform patterns transmitted by first and second antennas in accordance with an embodiment of the invention.
Figure 8:
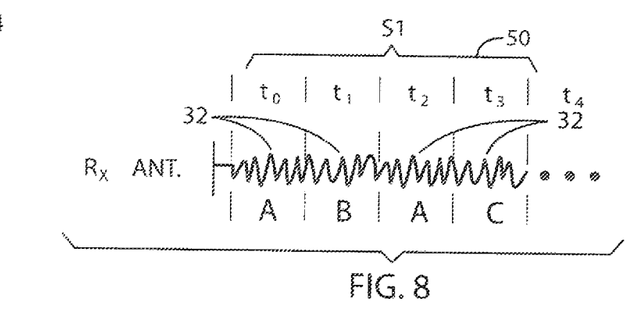
FIG. 8 is a diagram of exemplary waveform patterns observed by a receiver for the exemplary waveform patterns of FIG. 7.

Referring now to FIG. 7, a diagram of exemplary waveform patterns 32 of a data symbol 50, transmitted by the first and second antennas 20 and 22, respectively, is provided. In a first time period (labeled "t0"), the first antenna 20 ("ANT 0") transmits a first waveform pattern "A." Then, in a second time period (labeled "t1"), the first antenna 20 ("ANT 0") transmits a second waveform pattern "B." Then, in a third time period (labeled "t3"), the second antenna 22 ("ANT 1") transmits a third waveform pattern "A." Finally, in a fourth time period (labeled "t4"), the second antenna 22 ("ANT 1") transmits a fourth waveform pattern "C." As a result, the RF communication system 10 transmits data symbol 1 ("S1"), and may continue to transmit remaining data symbols 50 of a packet 44. Referring also to FIG. 8, a single receiver antenna 62 receives each of the four waveform patterns ("A," "B," "A" and "C") at the respective times ("t0," "t1," "t2" and "t3"). However, although the receiver system observes the first data stream 24 via the received data symbol 50 (constructed from the waveform patterns), the second data stream 26, sent via antenna index coding by the transmit system, is initially less apparent at the receiver antenna 62.

Figure 9:
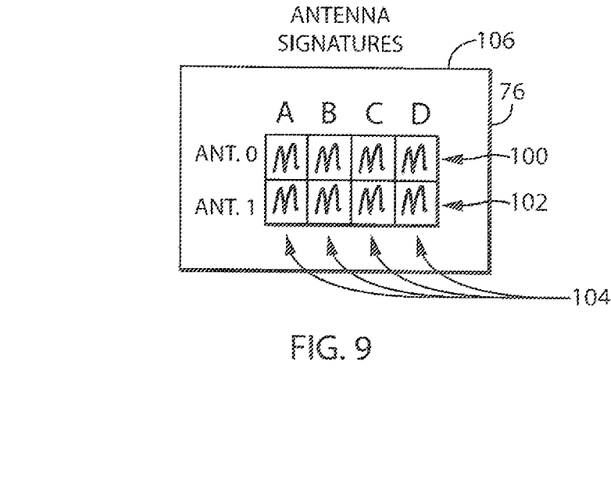
FIG. 9 is an exemplary table of collection of waveform patterns per antenna in accordance with an embodiment of the invention.
Figure 10:
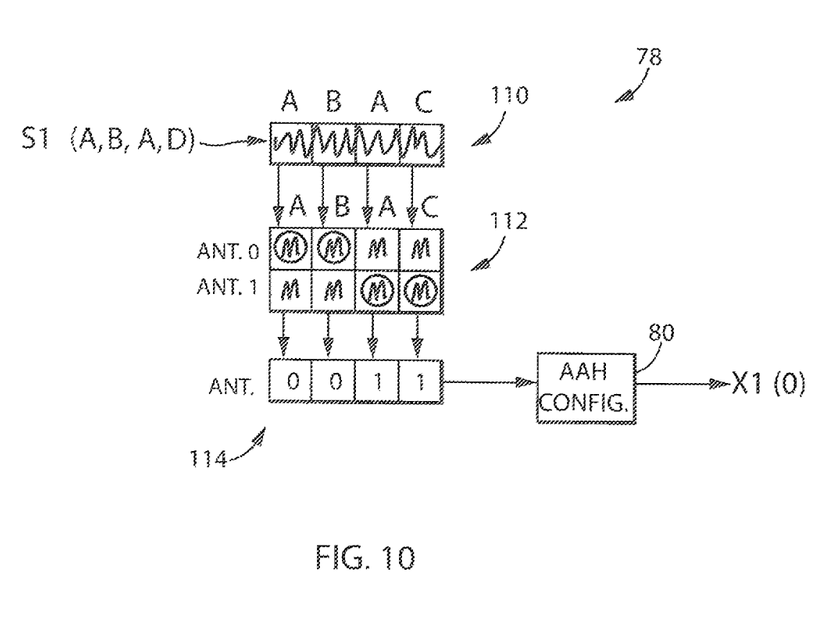
FIG. 10 is an exemplary comparison of waveform patterns corresponding to a first data stream to the collection of waveform patterns per antenna of FIG. 9 to determine which antennas sent the waveform patterns for receiving a second data stream in accordance with an embodiment of the invention.

Referring now to FIGS. 9 and 10, the decoding system 70 of the receiver system operates to decode the second data stream 26. In particular, the signature library 76 may include a predetermined set of waveform patterns per antenna, provided by the distortion analyzer 72 via the antenna template 48. For example, the signature library 76 may include a first row 100 of the waveform patterns 32 corresponding to the first antenna 20 (ANT 0) and a second row 102 of the waveform patterns 32 corresponding to the second antenna 22 (ANT 1). As a result, columns 104 of the first and second rows may correspond to each of the waveform patterns 32 ("A," "B," "C" and "D") with their respective signal constellation patterns as observed by the distortion analyzer 72 (see also FIGS. 5B and 5C). Consequently, the signature library 76 maintains a collection 106 of waveform patterns per antenna, which may be periodically updated via preambles 42 of packets 44.

With knowledge of the first data stream 24 decoded and/or demodulated, such as waveform patterns "A." "B." "A" and "C" of Symbol "S1" of FIGS. 6-8, the comparator engine 78 may compare such waveform patterns to corresponding waveform patterns for various antennas from the signature library 76. For example, with feedback 110 including the first waveform pattern as corresponding to waveform pattern "A" (from the first data stream 24), the comparator engine 78 may compare 112 the waveform pattern received at "t0" with the waveform pattern of "A" for ANT 0 and the waveform pattern of "A" for ANT 1 in the signature library 76. Calculating Euclidean distances between the received waveform pattern and corresponding waveform patterns of the signature library 76 (such as by aligning points between signature constellation patterns and a received signal constellation pattern), the comparator engine 78 may then determine a template match 114 of which antenna sent the waveform pattern (in this case, ANT 0).

The comparator engine 78 may proceed in like manner to resolve the antenna index for each of the waveform patterns of the data symbol. Then, the comparator engine 78 may apply the template match 114 to the AAH configuration 80 to decode extra bits of the second data stream 26 (in this case, "X1" or bit "0").

Figure 11:
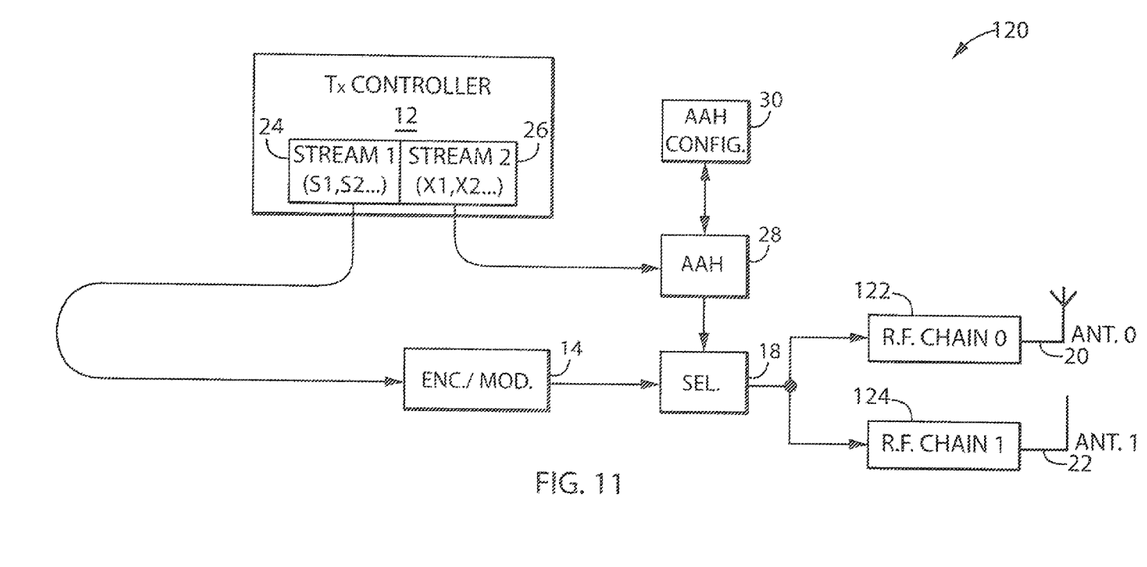
FIG. 11 is a diagram of an alternative RF communication system with a transmitter in accordance with an embodiment of the invention.

Referring now to FIG. 11, a diagram of an alternative RF communication system 120 (transmit system) which may be used for wireless data transmission is provided in accordance with an embodiment of the invention. Although exemplified in FIG. 11 as a transmitter, the RF communication system 120 will also typically be part of a transceiver in a larger wireless communicating device, such as a smart-phone, tablet, battery powered or other device, allowing both transmit and receive functions. For example, the RF communication system 120 may be part of an Orthogonal Frequency Division Multiplexing (OFDM) communication network, such as with respect to IEEE 802.11g or 802.11n specifications.

The RF communication system 120 may similarly include a controller 12 in communication with an encoder/modulator 14, and an AAH control system 28, in communication with an AAH configuration 30, for controlling a switch 18, and first and second antennas 20 and 22, respectively, configured for effecting RF transmissions. However, in order to simultaneously transmit multiple subcarriers per time period, the RF communication system 120 may also include first and second RF chains 122 and 124, in communication with the first and second antennas 20 and 22, respectively. The first and second RF chains 122 and 124 may each typically include a DAC, amplifiers, filters, signal conditioners and/or other elements for effecting RF communication as known in the art. Accordingly, the RF communication system 120 may realize frequency domain antenna index coding, and therefore transmission of the second data stream 26, by the AAH control system 28 controlling the switch 18 to selectively switch multiple subcarrier waveform patterns among the differing antennas, such as among the first and second antennas 20 and 22, respectively. Although antenna index coding in the frequency domain may include multiple RF chains, the receiver system may still operate using only a single RF-chain (such as the RF chain 64).

Figure 12:
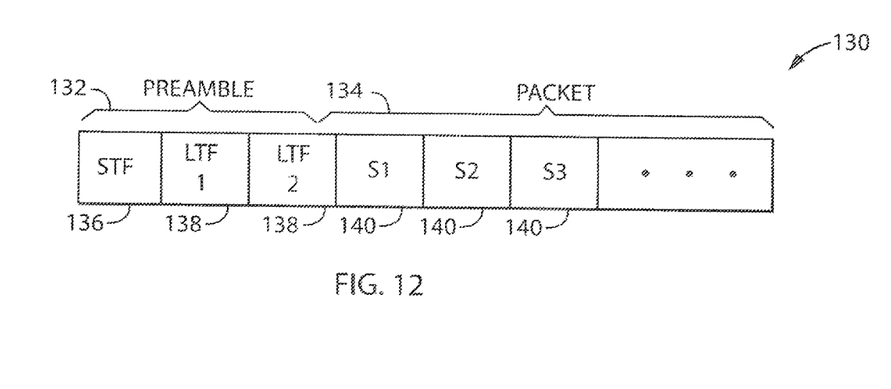
FIG. 12 is an exemplary transmission which may be sent by the RF communication system of FIG. 11.

Referring now to FIG. 12, an exemplary transmission 130 which may be sent by the RF communication system 120 is provided. The transmission 130 may include a preamble 132 followed by a packet 134 (or data payload) consisting of multiple data symbols 140. The preamble 132 could include, for example, a short-training field 136 and a long-training field 138, which may be repeated. The short-training field 136 may be a start protocol recognizable by an RF receiver such that, upon detecting the start protocol, which may be periodic patterns in the time-domain, the RF receiver is prepared to receive subsequent fields of the transmission 130. For example, the short-training field 136 could be a WiFi synchronization preamble. The long-training field 138 may be used to estimate frequency offset and estimate per-subcarrier channel gain (magnitude/phase distortion). Accordingly, the long-training field 138 may provide a predetermined set of subcarrier waveform patterns per antenna (such as a known random sequence transmitted sequentially by each transmit antenna), such that the RF receiver may receive and recognize signal constellation patterns for the subcarrier waveform patterns for each transmit antenna (see also FIGS. 5B and 5C). Different transmit antennas of the transmit system may each send the same form of training preambles (such as the long-training field 138); and the receiver system, via the receiver antenna, may receive each of the training preambles and may distinguish the different transmit antennas by the channel distortions over each of the training preambles. The communication system 120 may send the transmission 130 to the RF communication system 60 (receiver system).

Figure 13:
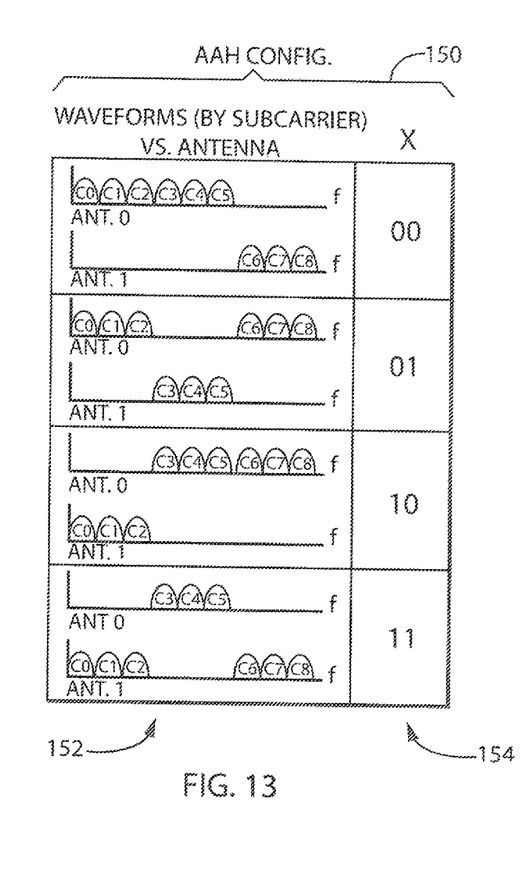
FIG. 13 is a table of an exemplary adaptive antenna hopping configuration with a minimum number of subcarrier waveform patterns per antenna corresponding to extra bits which may be transferred in accordance with an embodiment of the invention.

Referring now to FIG. 13, a table 150 of an exemplary adaptive antenna hopping configuration with a minimum number of subcarrier waveform patterns per antenna corresponding to extra bits which may be wirelessly communicated is provided. Following resolution by the channel estimator 74 (as described above with respect to FIG. 3), the table 150 (which may be updated after a polling packet) may be provided to the AAH configuration 30 for the transmitter system and the AAH configuration 80 for the receiver system.

In a first column 152 of the table 90, various possibilities are provided for the transmitter system to transmit a data symbol which may consist of multiple subcarrier waveform patterns across different channels in the frequency domain (labeled sequentially "c0," "c1," "c2," and so forth in the table 150) using various antennas. For example, in a first row of the column 152, six subcarrier waveform patterns may be sent by ANT 0 (such as subcarrier waveform patterns "c0," "c1," "c2," "c3," "c4" and "c5") simultaneously with three subcarrier waveform patterns being sent by ANT 1 (such as subcarrier waveform patterns "c6," "c7" and "c8").

In a second column 154 of the table 150, extra bits are provided as corresponding to particular antenna configurations for the subcarrier waveform patterns for each respective row. For example, in a first row of the column 154, corresponding to the first row of the column 152, the transmit system (RF communication system 120) may transmit extra bit "00," as part of the second data stream 26, by transmitting the first six subcarrier waveform patterns of a data symbol via ANT 0, then transmitting the next three subcarrier waveform patterns of the data symbol via ANT 1. The receiver system (RF communication system 60), in turn, may receive the extra bit "00." as part of the second data stream 26, upon decoding the antenna index of the received subcarrier waveform patterns of the data symbol.

As part of adaptive antenna hopping, the AAH control system 28, according to the AAH configuration 30 (and the table 150) set by the channel estimator 74, may require the transmit system to send a minimum number of subcarrier waveform patterns per antenna. Accordingly, the channel estimator 74 (of the receiver system), upon performing channel estimation per antenna, may determine an optimal value for a minimum number of subcarrier waveform patterns to be transmitted per antenna in order to minimize subcarrier waveform pattern decoding errors by the receiver system. For example, as shown in FIG. 13, the value for a minimum number of subcarrier waveform patterns to be transmitted per antenna may be set to three, with at least three subcarrier waveform patterns being transmitted by ANT 0 and at least three subcarrier waveform patterns being transmitted by ANT 1 per data symbol.

Figure 14:
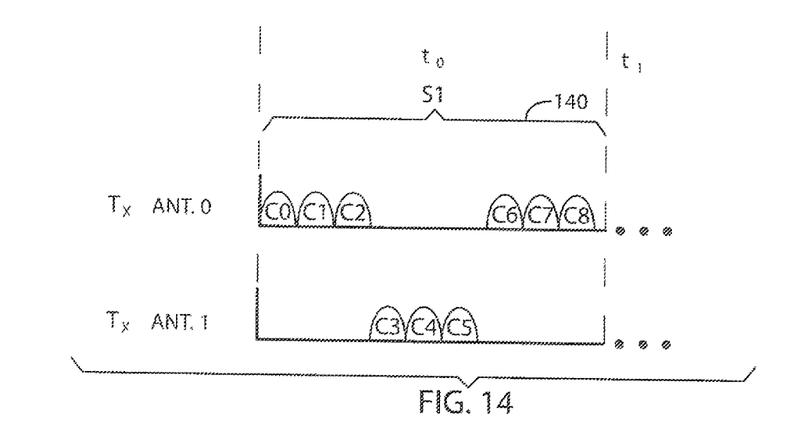
FIG. 14 is a diagram of exemplary subcarrier waveform patterns transmitted by first and second antennas in accordance with an embodiment of the invention.
Figure 15:
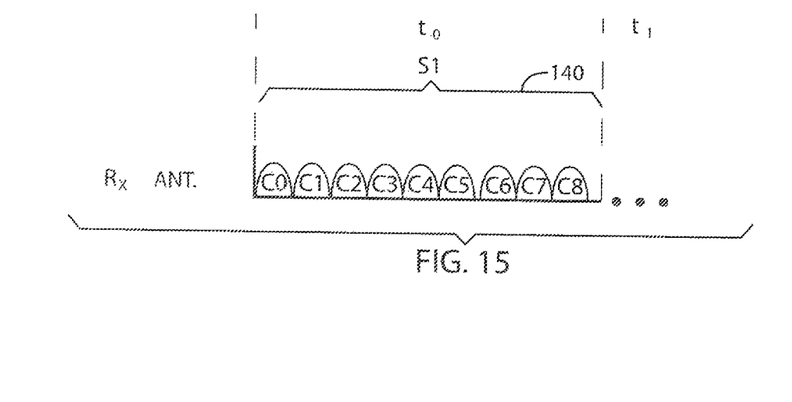
FIG. 15 is a diagram of exemplary subcarrier waveform patterns observed by a receiver for the exemplary subcarrier waveform patterns of FIG. 7.

Referring now to FIG. 14, a diagram of exemplary subcarrier waveform patterns of a data symbol 140, transmitted by the first and second antennas 20 and 22, respectively, is provided. In a first time period (labeled "t0"), the first antenna 20 ("ANT 0") transmits subcarrier waveform patterns "c0," "c1," "c2," "c6," "c7" and "c8." Also in the first time period ("t0"), the second antenna 22 ("ANT 1") transmits subcarrier waveform patterns "c3," "c4" and "c5." As a result, the RF communication system 120 transmits data symbol 1 ("S1"), and may continue to transmit remaining data symbols 140 of a packet 134. Referring also to FIG. 15, a single receiver antenna 62 receives each of the nine subcarrier waveform patterns ("c0" through "c8") at the respective time ("t0"). However, although the receiver system observes the first data stream 24 via the received data symbol 140 (constructed from the subcarrier waveform patterns), the second data stream 26, sent via antenna index coding by the transmit system, is initially less apparent at the receiver antenna 62.

Figure 16:
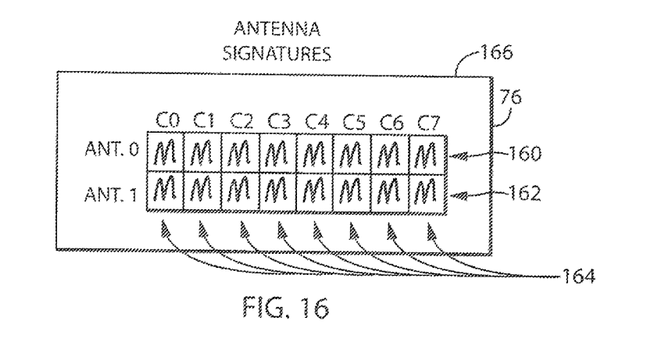
FIG. 16 is an exemplary table of collection of subcarrier waveform patterns per antenna in accordance with an embodiment of the invention.
Figure 17:
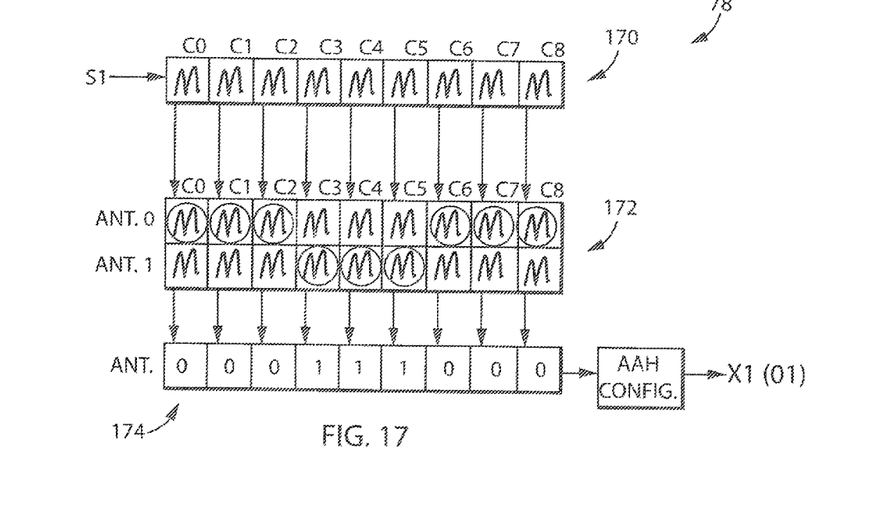
FIG. 17 is an exemplary comparison of subcarrier waveform patterns corresponding to a first data stream to the collection of subcarrier waveform patterns per antenna of FIG. 16 to determine which antennas sent the subcarrier waveform patterns for receiving a second data stream in accordance with an embodiment of the invention.

Referring now to FIGS. 16 and 17, the decoding system 70 of the receiver system operates to decode the second data stream 26. In particular, the signature library 76 may include a predetermined set of subcarrier waveform patterns per antenna, provided by the distortion analyzer 72 via the long-training field 138. For example, the signature library 76 may include a first row 160 of subcarrier waveform patterns corresponding to the first antenna 20 (ANT 0) and a second row 162 of subcarrier waveform patterns corresponding to the second antenna 22 (ANT 1). As a result, columns 164 of the first and second rows may correspond to a predetermined sequence of each of the subcarrier waveform patterns ("c0" through "c8") with their respective signal constellation patterns as observed by the distortion analyzer 72 (see also FIGS. 5B and 5C). Consequently, the signature library 76 maintains a collection 166 of subcarrier waveform patterns per antenna, which may be periodically updated via preambles 132 of packets 134.

Next, the comparator engine 78 may compare received subcarrier waveform patterns to corresponding subcarrier waveform patterns for various antennas from the signature library 76. For example, the comparator engine 78 may compare 172 the subcarrier waveform pattern received for "c0" with the subcarrier waveform pattern of "c0" for ANT 0 and the subcarrier waveform pattern of "c0" for ANT 1 in the signature library 76. Calculating Euclidean distances between the received subcarrier waveform pattern and corresponding subcarrier waveform patterns of the signature library 76 (such as by aligning points between signature constellation patterns and a received signal constellation pattern), the comparator engine 78 may then determine a template match 174 of which antenna sent the subcarrier waveform pattern (in this case, ANT 0). The comparator engine 78 may proceed in like manner to resolve the antenna index for each of the subcarrier waveform patterns of the data symbol. Then, the comparator engine 78 may apply the template match 174 to the AAH configuration 80 to decode extra bits of the second data stream 26 (in this case, "X1" or bits "01").

In alternative aspects, multiple transmit antennas and/or multiple receive antennas of varying quantities may be used. In typical applications, one or more antennas may also be used for both transmit and receive functions using a transceiver in one device. Also, multiple waveform patterns and/or subcarrier waveform patterns of varying quantities may be used.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a computer" and "a processor" or "a core" can be understood to include one or more processors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What is claimed is:

1. A Radio Frequency (RF) communication system comprising:
    first and second antennas;
    an RF transmitter in communication with the first and second antennas, the RF transmitter being operable to send a data symbol using at least one of the first and second antennas, the data symbol comprising a plurality of waveform patterns, the data symbol forming a first data stream; and
    a control system in communication with the RF transmitter, the control system being operable to send a second data stream by selectively switching the RF transmitter to send a first portion of the data symbol using the first antenna and a second portion of the data symbol using the second antenna,
    wherein the first portion is a first series of waveform patterns and the second portion is a second series of a waveform patterns.

2. The RF communication system of claim 1, wherein the control system is further operable to control the RF transmitter to send a minimum number of waveform patterns per antenna before switching antennas.

3. The RF communication system of claim 2, further comprising an RF receiver, wherein the control system sets the minimum number of waveform patterns per antenna to a value determined by the RF receiver.

4. The RF communication system of claim 3, wherein the RF receiver determines the value in order to minimize waveform pattern decoding errors.

5. The RF communication system of claim 1, further comprising an RF receiver, wherein the RF receiver stores a collection of waveform patterns per antenna, and wherein the RF receiver is operable to receive the second data stream by comparing the first and second waveform patterns to the collection of waveform patterns per antenna in order to determine which antennas sent the first and second waveform patterns.

6. The RF communication system of claim 1, wherein the first data stream comprises a plurality of data symbols and the RF transmitter is operable to send a preamble before the plurality of data symbols, the preamble including a start protocol recognizable by an RF receiver.

7. The RF communication system of claim 6, wherein the preamble further includes an antenna template providing a predetermined plurality of waveform patterns per antenna.

8. The RF communication system of claim 1, wherein the first data stream is a ZigBee communication.

9. A method of RF communication using an RF transmitter in communication with first and second antennas, the method comprising:
    sending a plurality of data symbols using the first and second antennas, each data symbol comprising a plurality of waveform patterns, the plurality of data symbols forming a first data stream; and
    sending a second data stream by selectively switching the RF transmitter to send a first portion of the data symbol using the first antenna and a second portion of the data symbol using the second antenna,
    wherein the first portion is a first series of waveform patterns and the second portion is a second series of a waveform patterns.

10. The method of claim 9, further comprising storing a collection of waveform patterns per antenna at an RF receiver and, upon the RF receiver receiving a data symbol, comparing the waveform patterns of the data symbol to the collection of waveform patterns per antenna in order to determine which antennas sent the waveform patterns of the data symbol.

11. An RF communication system comprising:
    first and second antennas;
    first and second RF transmitters in communication with the first and second antennas, respectively, the first and second RF transmitters being operable to send a data symbol using the first and second antennas, the data symbol comprising a plurality of subcarrier waveform patterns, the data symbol forming a first data stream; and
    a control system in communication with the first and second RF transmitters, the control system being operable to send a second data stream by sending a first series of subcarrier waveform patterns using the first antenna and a second series of subcarrier waveform patterns using the second antenna.

12. The RF communication system of claim 11, wherein the control system is further operable to control the first and second RF transmitters to send a minimum number of subcarrier waveform patterns per antenna.

13. The RF communication system of claim 12, further comprising an RF receiver, wherein the control system sets the minimum number of subcarrier waveform patterns per antenna to a value determined by the RF receiver.

14. The RF communication system of claim 13, wherein the RF receiver determines the value in order to minimize subcarrier waveform pattern decoding errors.

15. The RF communication system of claim 11, further comprising an RF receiver, wherein the RF receiver stores a collection of subcarrier waveform patterns per antenna, and wherein the RF receiver is operable to receive the second data stream by comparing the first and second subcarrier waveform patterns to the collection of subcarrier waveform patterns per antenna in order to determine which antennas sent the first and second subcarrier waveform patterns.

16. The RF communication system of claim 11, wherein the first data stream comprises a plurality of data symbols and the RF transmitter is operable to send a preamble before the plurality of data symbols, the preamble including a start protocol recognizable by an RF receiver.

17. The RF communication system of claim 16, wherein the preamble further includes an antenna template providing a predetermined plurality of subcarrier waveform patterns per antenna.

18. The RF communication system of claim 11, wherein the first data stream is an Orthogonal Frequency Division Multiplexing (OFDM) communication.

19. A method of RF communication using first and second RF transmitters in communication with first and second antennas, respectively, the method comprising:
  sending a plurality of data symbols using the first and second antennas, each data symbol comprising a plurality of subcarrier waveform patterns, the plurality of data symbols forming a first data stream; and
  sending a second data stream by switching the RF transmitter to send a first series of subcarrier waveform patterns of a data symbol using the first antenna and a second series of subcarrier waveform patterns of the data symbol using the second antenna.

20. The method of claim 19, further comprising storing a collection of subcarrier waveform patterns per antenna at an RF receiver and, upon the RF receiver receiving a data symbol, comparing the subcarrier waveform patterns of the data symbol to the collection of subcarrier waveform patterns per antenna in order to determine which antennas sent the subcarrier waveform patterns of the data symbol.

\* \* \* \* \*